United States Patent [19]

Sawai et al.

[11] Patent Number: 5,299,085
[45] Date of Patent: Mar. 29, 1994

[54] COMPACT ROTATING HEAD ASSEMBLY

[75] Inventors: Jun Sawai; Hiroshi Kiriyama, both of Kanagawa, Japan

[73] Assignee: Sony Corporation, Japan

[21] Appl. No.: 861,589

[22] Filed: Apr. 1, 1992

[30] Foreign Application Priority Data

Apr. 5, 1991 [JP] Japan .................................. 3-099702

[51] Int. Cl.⁵ .................................................. G11B 5/52
[52] U.S. Cl. ................................ 360/108; 360/130.24
[58] Field of Search ................................ 360/107–109, 360/130.22–130.24, 84

[56] References Cited

U.S. PATENT DOCUMENTS

| 4,706,144 | 11/1987 | Asada et al. | 360/108 |
| 5,019,926 | 5/1991 | Van Thuijl et al. | 360/108 |

FOREIGN PATENT DOCUMENTS

| 52-41504 | 3/1977 | Japan | 360/108 |
| 59-178601 | 10/1984 | Japan | 360/108 |

*Primary Examiner*—Stuart S. Levy
*Assistant Examiner*—Jefferson Evans
*Attorney, Agent, or Firm*—Ronald P. Kananen

[57] ABSTRACT

A rotating head assembly which is arranged to suppress crosstalk between signals in signal transmission paths to or from erasing, recording and a reproducing heads mounted on a head rotating body, the rotating head assembly including: a plural number of rotary transformers located concentrically around the circumference of a rotational shaft of the head rotating body in spaced positions in a radial direction or in a direction perpendicular to the axis of the rotational shaft; a plural number of substrate boards located in spaced positions in the axial direction of the head rotating body; and a path of signal transmission for the erasing head and/or recording head and a path of signal transmission for the reproducing head routed separately through the rotary transformers in radially spaced positions and through the substrate boards in axially spaced positions to prevent crosstalk between signals being passed the respective signal transmission paths.

4 Claims, 3 Drawing Sheets

COMPACT ROTATING HEAD ASSEMBLY

BACKGROUND OF THE INVENTION

1. Field of the Art

This invention relates to a rotating head assembly suitable for application to digital video tape recorders or the like, and more particularly to a signal transmission path arrangement on such a rotating head assembly.

2. Description of the Prior Art

Illustrated in FIGS. 2 and 3 is a conventional rotating head assembly for digital video tape recorder, wherein upper and lower stationary drums 2 and 3 which are located coaxially on the upper and lower sides of a head rotating body 1 are integrally fixed to each other at one side by means of a drum holder 4. The head rotating body 1 is constituted by a rotary flange 1a which is fixedly mounted at its center on the upper end of a vertical rotational shaft 5, and a rotatary disc 1b which is securely fixed on and along the outer periphery of the rotary flange 1a. The lower end of the rotational shaft 5 is directly coupled with the output shaft of a motor 6 which is fixedly mounted on a lower portion of the lower stationary drum 3. The rotational shaft 5 is rotatably supported through a bearing 3b in a vertical cylindrical portion 3a which is integrally formed at the center of the lower stationary drum 3.

For recording and/or reproducing video signals, paired rotating heads, namely, a pair of erasing heads 7, a pair of recording heads 8 and a pair of reproducing heads 9 are mounted on the lower side of outer peripheral portions of the rotary disc 1b on the head rotating body 1 at an angular interval of 180°. These plural number of heads 7 to 9 are protruded radially outward through a gap 10 between the upper and lower stationary drums 2 and 3. For recording and/or reproducing a magnetic tape (not shown) which is transported helically along the outer peripheries of the upper and lower stationary drums 2 and 3, the plural number of heads 7 to 9 are rotationally driven from the motor 6 together with the head rotating body 1 through the rotational shaft 5.

In this conventional rotating head assembly, a cylindrical portion 1c which is integrally formed in a lower portion of the rotary flange 1a of the head rotating body 1 is concentrically fitted around the outer periphery of the afore-mentioned cylindrical portion 3a. Three sets of rotary transformers 11 to 13 for transmission of signals to or from the erasing heads 7, recording heads 8 and reproducing heads 9 are located between the cylindrical portions 1c and 3a in series in the axial direction (in three successive positions in the axial direction).

For instance, the signal transmission path A for the erasing head 7 is routed from a harness 14a to the stator 11a of a rotary transformer 11 in the lower position through an annular relay board 15 mounted on an inner bottom portion of the lower stationary drum 3 and a harness 16a, from the rotor 11b of the transformer to a common substrate board 19 of annular shape through a sub-harness 20a, a common annular relay board 17, mounted on upper portions of the rotary flange 1a and rotary disc 1b of the head rotating body 1, and a contact 18a, and from the common substrate board 19 to the erasing head 7 through a harness 21a.

Further, for instance, the signal transmission path B for the reproducing head 9 is routed from a harness 14b to the stator 12a of a rotary transformer 12 in the middle position through a relay board 15 on an inner bottom portion of the lower stationary drum 3 and a harness 16b, from the rotor 12b of the transformer to the common substrate board 19 through a relay board 17 on an upper portion of the head rotating body 1 and a contact 18b, and from the common substrate board 19 to the reproducing head 9 through a harness 21b. The signal transmission path for the recording head 8 is routed in a similar manner by the use of the rotary transformer 13 in the upper position.

In this instance, a plural number of spacers 22 are interposed between the rotary transformers 11 to 13 to prevent crosstalk between signals in the respective signal paths.

However, the above-described arrangement of the conventional rotating head assembly, having the three rotary transformers 11 to 13 located in series in the axial direction and having a plural number of spacers interposed between these rotary transformers 11 to 13 for the purpose of preventing crosstalk of the respective signals, suffers from a problem that the rotating head assembly as a whole needs to have a relative large height in the axial direction.

Besides, since the signal transmission paths between the rotors 11b, 12b and 13b of the rotary transformers 11 to 13 and the respective heads 7 are all routed through the common substrate board 19 which is mounted on an upper portion of the head rotating body 1, it has been necessary to pay special attention to the circuit arrangement on the common substrate board 19 or to employ shield cases or other countermeasures to prevent the crosstalk between the signals being passed through the common substrate board 19, resulting in an increased number of component parts or an increased number of steps in the assembling process, which is reflected by a higher cost.

SUMMARY OF THE INVENTION

The present invention contemplates to solve the above-mentioned problems, and has as its object the provision of a rotating head assembly which is remarkably reduced in height in the axial direction and which can suppress crosstalk between the respective signals.

In accordance with the present invention, for achieving the above-stated objective, there is provided a rotating head assembly having an erasing head, a recording head and a reproducing head mounted on a head rotating body, the rotating head assembly essentially including: a plural number of rotary transformers concentrically located around the circumference of the rotational shaft of the head rotating body in spaced positions in a radial direction perpendicular to the axis of the rotational shaft; a plural number of substrate boards located in spaced positions in the axial direction of the head rotating body; a path of signal transmission for the erasing head and/or the recording head and a path of signal transmission for the reproducing head routed separately through the plural number of rotary transformers in radially spaced positions and the plural number of substrate boards in axially spaced positions.

In the rotating head assembly with the above-described arrangement according to the invention, the path of signal transmission for the erasing head and/or the recording head and the path of signal transmission for the reproducing head are formed separately through a plural number of rotary transformers, which are located concentrically in spaced positions in a direction perpendicular to the axis of the rotational shaft of the head rotating body, and through a plural number of wiring boards, which are located in spaced positions in the axial direction of the head rotating body, thereby to suppress crosstalk between the signals in the respective signal paths.

The above and other objects, features and advantages of the invention will become apparent from the following description and the appended claims, taken in conjunction with the accompanying drawings which show by way of example a preferred embodiment of the invention.

DESCRIPTION OF PREFERRED EMBODIMENTS

Figure 1:
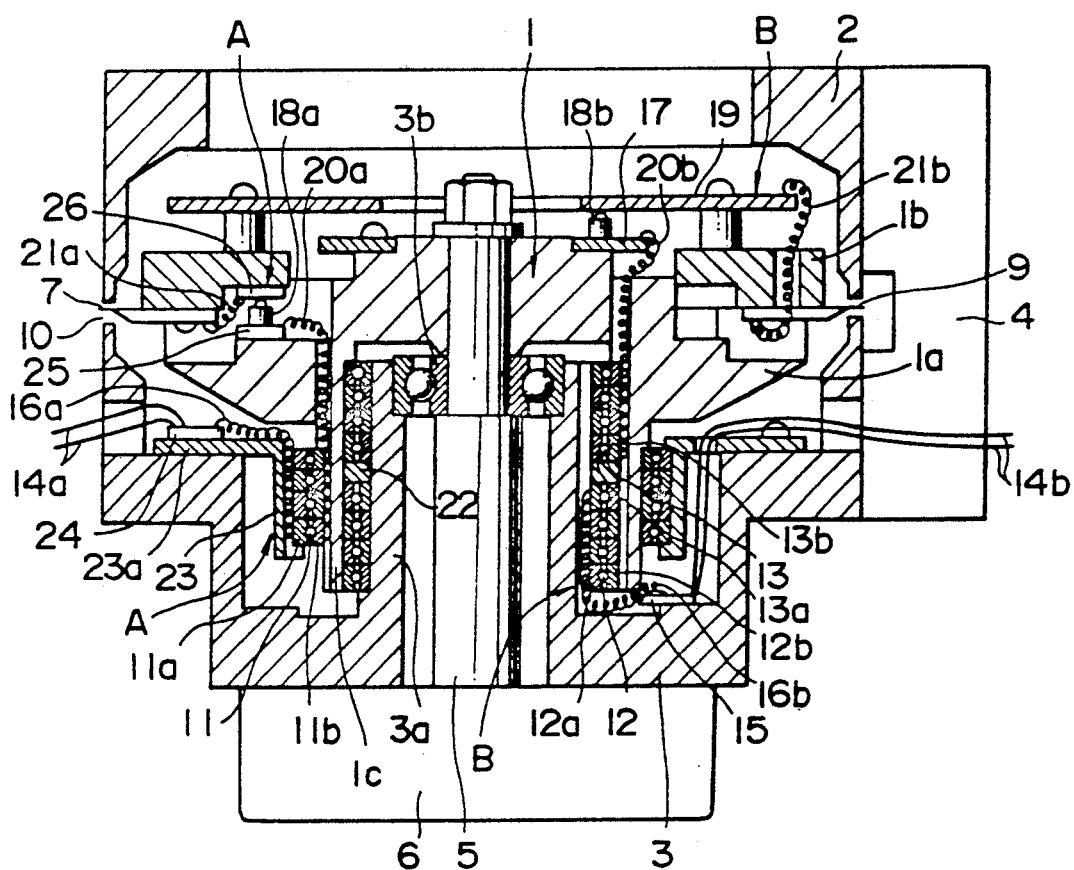
FIG. 1 is a sectional side view of a rotating head assembly embodying the present invention.
Figure 2:
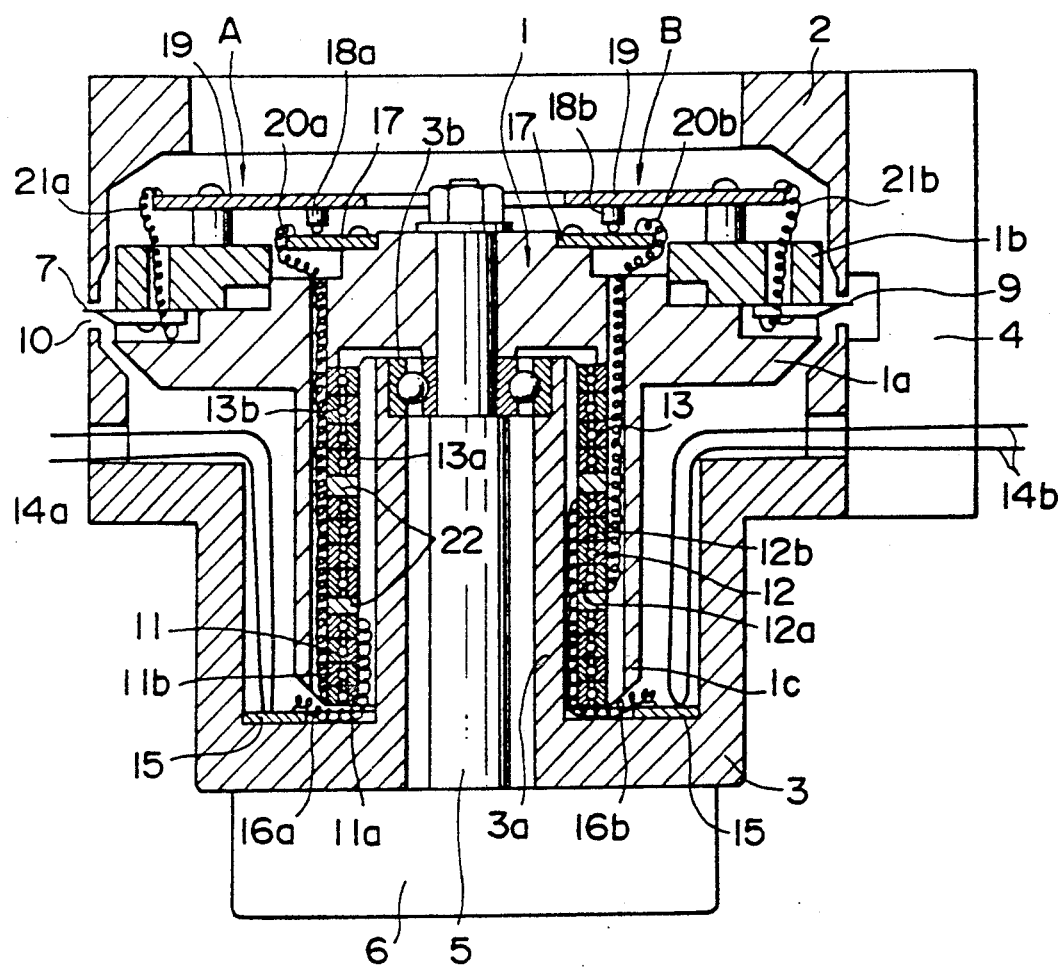
FIG. 2 is a view similar to FIG. 1 but showing a conventional rotating head assembly.
Figure 3:
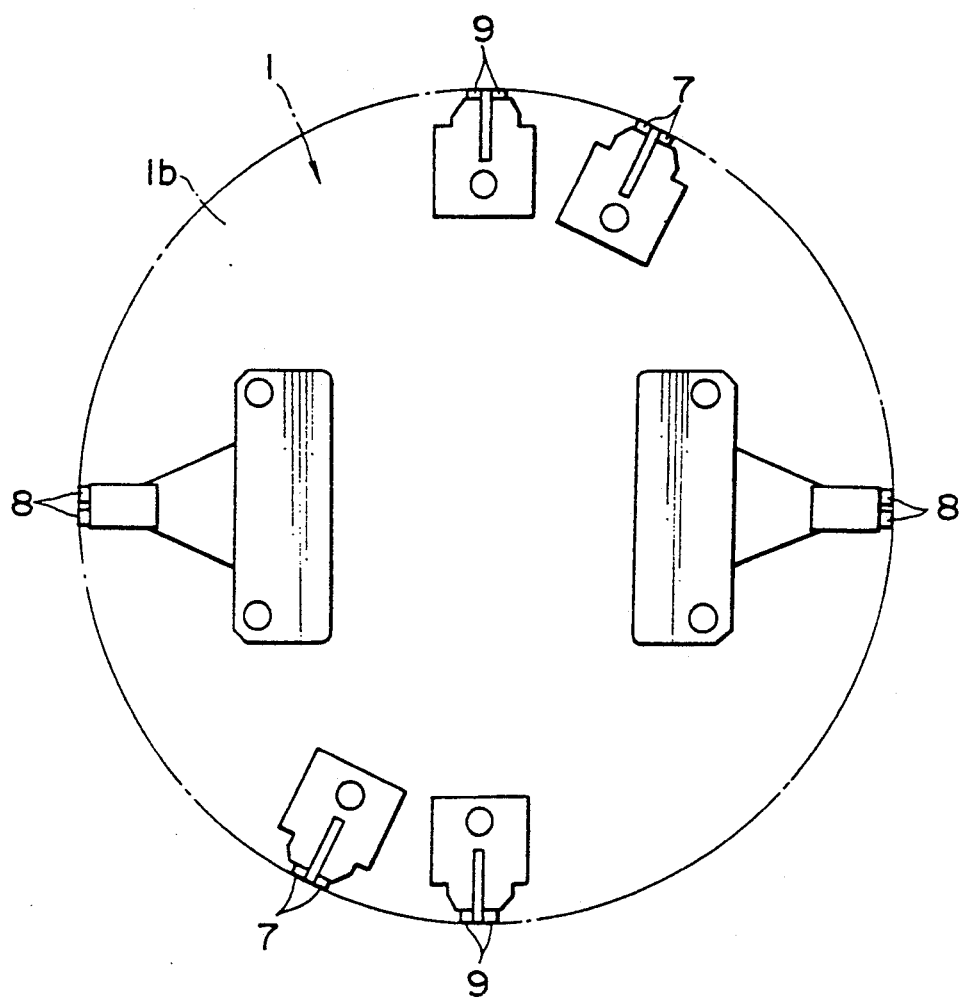
FIG. 3 is a diagrammatic plan view explanatory of a layout of rotating heads.

Hereafter, the invention is described more particularly with reference to FIG. 1 illustrating an embodiment of the invention which is applied to a rotating head assembly for digital video tape recorder In the following description, those component parts which are common with the head assembly of FIGS. 2 and 3 are designated by common reference numerals and their description is omitted to avoid repetitions.

According to the invention, a bracket member with a cylindrical portion 23 is disposed concentrically on the outer side of the cylindrical portion 1c of the head rotating body 1 and securely fixed within the lower stationary drum 3 through a flange portion 23a. A rotary transformer 11, to be used exclusively for the erasing head 7, is located between the cylindrical portions 23 and 1c, while rotary transformers 12 and 13 to be used exclusively for the reproducing head 9 and recording head 9, respectively, are located between the cylindrical portions 1c and 3a in series in the axial direction. Accordingly, the rotary transformer 11 is located on the outer side of the-rotary transformers 12 and 13 and spaced from the latter in a direction perpendicular to the axis of the rotational shaft 5. Besides, as compared with the conventional counterparts shown in FIG. 2, the cylindrical portions 1c and 3a are reduced in length by a dimension corresponding to the length of the rotary transformer 11.

The path of signal transmission for the erasing head 7 is routed from a harness 14a to the stator 11a of the rotary transformer 11 through a relay board 24, mounted on the flange 23a, and harness 16a, from the rotor 11b of the transformer to a relay board 26, mounted on the lower side of the rotatary disc 1b, through a harness 20a, a relay board 25, mounted on the upper side of the rotary flange 1a of the head rotating body 1, and contact 18a, and from the relay board 26 to the erasing head 7 through a harness 21a.

On the other hand, the path of signal transmission for the reproducing head 9 is routed, similarly to the conventional counterpart, from the harness 14b to the reproducing head 9 through the relay board 15, harness 16b, rotary transformer 12, harness 20b, relay board 17, contact 18b, relay board 19 and harness 21b. The path of signal transmission for the recording head 8 is formed in a similar manner except that it is routed through the rotary transformer 13.

With the rotating head assembly of the above arrangement, the rotary transformer 11 which is used exclusively for the erasing head 7 is located on the outer side of the other rotary transformers 12 and 13, and separated therefrom in a direction perpendicular to the axis of the rotational shaft 5 to prevent crosstalk between the erasing signal and other signals.

Further, the above arrangement, with the rotary transformer 11 located on the outer side of the other rotary transformers 12 and 13, permits to reduce the axial height of the rotating head assembly to a marked degree, namely, to a degree corresponding to the length of the rotary transformer 11 as compared with the conventional counterpart of FIG. 2.

If desired, the signal transmission path of the recording head 8 may be separated in the same manner as the signal transmission path of the erasing head 7.

Although the invention has been described by way of one preferred embodiment, it is to be understood that the invention is not restricted to the particular forms shown in the foregoing embodiment, which is open to various modifications or alterations on the basis of the technical concept of the present invention.

Being arranged as described above, the rotating head assembly of the present invention has the following effects.

Since the path of signal transmission for an erasing head and/or a recording head and the path of signal transmission for a reproducing head are routed separately through a plural number of rotary transformers, which are located at concentrically spaced positions in a direction perpendicular to the axis of the rotational shaft of the head rotating body, and through a plural number of substrate boards, which are located in spaced positions in the axial direction of the head rotating body, the invention contributes to supress crosstalks between the respective signals and to reduce the axial height of the rotating head assembly as a whole.

In addition, there is no need for employing shield cases or other countermeasures for prevention of crosstalk between the respective signals, so that it becomes possible to simplify the construction and to reduce the number of component parts or the number of steps in the assembling process from a standpoint of cost reduction.

What is claimed is:

1. A rotating head assembly having an erasing head, a recording head and a reproducing head mounted on a head rotating body, said rotating head assembly comprising:

a plural number of rotary transformers located concentrically around the circumference of a rotational shaft of said head rotating body;

a plural number of substrate boards located in spaced positions in the axial direction of said head rotating body; and a signal transmission path for said erasing head and-/or recording head and a signal transmission path for said reproducing head routed separately through said rotary transformers in radially spaced positions and through said substrate boards in axially spaced positions;

wherein a first rotary transformer of said plural number of rotary transformers is spaced at least partially concentrically outside of a second rotary transformer of said plural number of rotary transformers, wherein said signal transmission path for said erasing head is routed through said first rotary transformer which is located on the outer side of said second rotary transformer and arranged to radially overlap said second rotary transformer.

2. A rotating head assembly as defined in claim 1, wherein a cylindrical bracket member is fixed concentrically on the outer side of a cylindrical portion of said head rotating body to support a stator of said first rotary transformer.

3. A rotating head assembly having an erasing head, a recording head and a reproducing head mounted on a head rotating body, said rotating head assembly comprising:
- a plural number of rotary transformers located concentrically around the circumference of a rotational shaft of said head rotating body;
- a plural number or substrate boards located in spaced positions in the axial direction of said head rotating body; and
- a signal transmission path for said erasing head and/or recording head and a signal transmission path for said reproducing head routed separately through said rotary transformer in radially spaced positions and through said substrate boards in axially spaced positions;
- wherein a first rotary transformer of said plural number of rotary transformers is spaced at least partially concentrically outside of a second rotary transformer of said plural number of rotary transformers, wherein said signal transmission path for said reproducing head is routed through said first rotary transformer which is located on the outer side of said second rotary transformer and arranged to radially overlap said second rotary transformer.

4. A rotating head assembly as defined in claim 3, wherein a cylindrical bracket member is fixed concentrically on the outer side of a cylindrical portion of said head rotating body to support a stator of said first rotary transformer.

* * * * *